United States Patent
Kwon et al.

(10) Patent No.: US 9,482,846 B2
(45) Date of Patent: Nov. 1, 2016

(54) IMAGING LENS

(71) Applicant: LG Innotek Co., Ltd., Seoul (KR)

(72) Inventors: Duk Keun Kwon, Seoul (KR); Jong Ha Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/597,021

(22) Filed: Jan. 14, 2015

(65) Prior Publication Data

US 2015/0124335 A1    May 7, 2015

Related U.S. Application Data

(63) Continuation of application No. 13/760,343, filed on Feb. 6, 2013, now Pat. No. 8,958,164.

(30) Foreign Application Priority Data

Feb. 16, 2012    (KR) .................. 10-2012-0015698

(51) Int. Cl.
| | |
|---|---|
| G02B 3/02 | (2006.01) |
| G02B 13/18 | (2006.01) |
| G02B 9/60 | (2006.01) |
| G02B 13/00 | (2006.01) |
| G02B 27/00 | (2006.01) |
| G02B 5/00 | (2006.01) |

(52) U.S. Cl.
CPC ............ *G02B 13/0045* (2013.01); *G02B 9/60* (2013.01); *G02B 5/005* (2013.01); *G02B 13/002* (2013.01); *G02B 13/0015* (2013.01); *G02B 13/18* (2013.01); *G02B 27/0025* (2013.01)

(58) Field of Classification Search
CPC .... G02B 13/0045; G02B 9/60; G02B 13/18; G02B 27/0025; G02B 5/005; G02B 13/0015; G02B 13/002
USPC .......................................... 359/714, 763, 764
See application file for complete search history.

(56) References Cited

U.S. PATENT DOCUMENTS

| | | | |
|---|---|---|---|
| 8,179,614 | B1 * | 5/2012 | Tsai ............................. 359/714 |
| 8,958,164 | B2 * | 2/2015 | Kwon et al. ................. 359/764 |
| 2011/0249347 | A1 * | 10/2011 | Kubota ......................... 359/764 |
| 2012/0218647 | A1 * | 8/2012 | Yonezawa .......... G02B 13/0045 359/714 |

FOREIGN PATENT DOCUMENTS

| | | |
|---|---|---|
| CN | 1942803 A | 4/2007 |
| CN | 101470249 A | 7/2009 |
| CN | 202102166 U | 1/2012 |
| CN | 202102168 U | 1/2012 |
| CN | 202110325 U | 1/2012 |
| CN | 202126531 U | 1/2012 |
| CN | 202141850 U | 2/2012 |
| JP | 2008-64823 A | 3/2008 |
| JP | 2012-3077 A | 1/2012 |
| WO | WO 2010/073522 A1 | 7/2010 |

\* cited by examiner

*Primary Examiner* — Evelyn A Lester
(74) *Attorney, Agent, or Firm* — Birch, Stewart, Kolasch & Birch, LLP

(57) ABSTRACT

An imaging lens, the imaging lens including in an ordered way from an object side, a first lens having positive (+) refractive power, a second lens having negative (−) refractive power, a third lens having negative (−) refractive power, a fourth lens having positive (+) refractive power, and a fifth lens having negative (−) refractive power, wherein meeting a conditional expression of 0.5<f1/f<1.5, where a focal length is f, and a focal length of the first lens is f1.

20 Claims, 4 Drawing Sheets

IMAGING LENS

This application is continuation of application Ser. No. 13/760,343, filed Feb. 6, 2013, which pursuant to 35 U.S.C. §119 (a) claims the benefit of earlier filing date and right of priority to Korean Patent Application No. 10-2012-0015698, filed on Feb. 16, 2012, the contents of which are hereby incorporated by reference in their entirety.

BACKGROUND OF THE DISCLOSURE

1. Field of the Disclosure

The teachings in accordance with exemplary embodiments of this disclosure relate generally to an imaging lens.

2. Description of Related Art

This section provides background information related to the present disclosure which is not necessarily prior art.

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such image pickup system obtains an image is an imaging lens producing an image.

Recently, there have been attempts to construct an imaging lens of high-resolution by using 5 pieces of lenses. Each of 5 pieces of lenses is comprised of lenses with a positive (+) refractive power and lenses with a negative (−) refractive power. For example, Korean Laid-open Patent Publication No. 2009-0048298 discloses an imaging lens adaptable to a miniaturized information terminal using 5 pieces of lenses.

An imaging lens of such a framework using 5 pieces of lenses must have satisfactory optic characteristics or aberration characteristics, and therefore an imaging lens with a high-resolution and a new power structure is required.

SUMMARY OF THE DISCLOSURE

This section provides a general summary of the disclosure, and is not a comprehensive disclosure of its full scope or all of its features.

Accordingly, exemplary embodiments of the present disclosure may relate to an imaging lens that substantially obviates one or more of the above disadvantages/problems due to limitations and disadvantages of related art, and it is an object of the present disclosure to provide a miniaturized compact imaging lens configured to have a high resolution.

Technical problems to be solved by the present disclosure are not restricted to the above-mentioned, and any other technical problems not mentioned so far will be clearly appreciated from the following description by skilled in the art.

In one general aspect of the present disclosure, there is provided an imaging lens, the imaging lens comprising, in an ordered way from an object side: a first lens having positive (+) refractive power; a second lens having negative (−) refractive power; a third lens having negative (−) refractive power; a fourth lens having positive (+) refractive power; and a fifth lens having negative (−) refractive power, wherein the imaging lens meets a conditional expression of $0.8<\Sigma T/((FLD)\times 2)<1.2$, where $\Sigma T$ is a distance from an object side surface of the first lens to an image-forming surface, and FLD is a distance from an optical axis to a maximum image height.

Preferably, but not necessarily, the imaging lens may meet a conditional expression of $0.5<f1/f<1.5$, where a focal length is f, and a focal length of the first lens is f1.

Preferably, but not necessarily, the imaging lens may meet a conditional expression of $0.5<\Sigma T/f<1.5$, where $\Sigma T$ is a distance from an object side surface of the first lens to an image-forming surface, and a focal length is f.

Preferably, but not necessarily, the imaging lens may meet a conditional expression of $1.6<N2<1.7$, where refractive index of the second lens is N2.

Preferably, but not necessarily, the imaging lens may meet a conditional expression of $1.5<N1<1.6$, $1.5<N3<1.6$, $1.5<N4<1.6$, $1.5<N5<1.6$, where each refractive index of the first, third, fourth and fifth lens is respectively N1, N3, N4 and N5.

Preferably, but not necessarily, the imaging lens may meet a conditional expression of $20<V2<30$, where Abbe's number of second lens is V2.

Preferably, but not necessarily, the imaging lens may meet a conditional expression of $50<V1<60$, $50<V3<60$, $50<V4<60$, $50<V5<60$, where Abbe's number of each of the first, third, fourth and fifth lens is respectively V1, V3, V4 and V5.

Preferably, but not necessarily, the imaging lens may meet a conditional expression of $0.6<\tan \Theta <0.8$, where a half field angle of the maximum image height is $\tan \Theta$.

Preferably, but not necessarily, all of the third, fourth and fifth lenses may be aspherical at both surfaces.

Preferably, but not necessarily, the fourth lens may take a meniscus shape concavely formed at an object side surface.

Preferably, but not necessarily, the fifth lens may take a meniscus shape convexly formed at an object side surface, and an object side surface and an image side surface may be all formed with inflection points.

Preferably, but not necessarily, an object side surface and an image side surface of the third lens may be all formed with inflection points, and the third lens may have a smaller refractive power than that of other lenses.

Preferably, but not necessarily, the imaging lens may meet a conditional expression of $0<|1/f3|<0.2$, where a focal length of the third lens is f3.

In another general aspect of the present disclosure, there is provided an imaging lens, the imaging lens comprising: in an ordered way from an object side: a first lens having positive (+) refractive power; a second lens having negative (−) refractive power; a third lens having negative (−) refractive power; a fourth lens having positive (+) refractive power; and a fifth lens having negative (−) refractive power, wherein an object side surface and an image side surface of the third lens are all formed with inflection points.

Preferably, but not necessarily, the third lens may have a smaller refractive power than that of the first, second, fourth and fifth lenses.

Preferably, but not necessarily, the imaging lens may meet a conditional expression of $0.8<\Sigma T/((FLD)\times 2)<1.2$, where $\Sigma T$ is a distance from an object side surface of the first lens to an image-forming surface, and FLD is a distance from an optical axis to a maximum image height.

Preferably, but not necessarily, the imaging lens may meet a conditional expression of $0.6<\tan \Theta <0.8$, where a half field angle of the maximum image height is $\tan \Theta$.

In still another general aspect of the present disclosure, there is provided an imaging lens, the imaging lens comprising: in an ordered way from an object side: a first lens having positive (+) refractive power; a second lens having negative (−) refractive power; a third lens having negative (−) refractive power; a fourth lens having positive (+)

refractive power; and a fifth lens having negative (−) refractive power, wherein an object side surface and an image side surface of the fifth lens are all formed with inflection points.

Preferably, but not necessarily, the imaging lens may meet a conditional expression of 0.8<ΣT/((FLD)×2)<1.2, where ΣT is a distance from an object side surface of the first lens to an image-forming surface, and FLD is a distance from an optical axis to a maximum image height.

Preferably, but not necessarily, the third lens may have a smaller refractive power than that of the first, second, fourth and fifth lenses.

The exemplary embodiments of the present disclosure have an advantageous effect in that the imaging lens is configured with 5 (five) pieces of lenses to have a high performance, a high resolution and a miniaturized construction.

DETAILED DESCRIPTION OF THE DISCLOSURE

Exemplary embodiments of the present disclosure will be described in detail with reference to the accompanying drawings.

Figure 1:
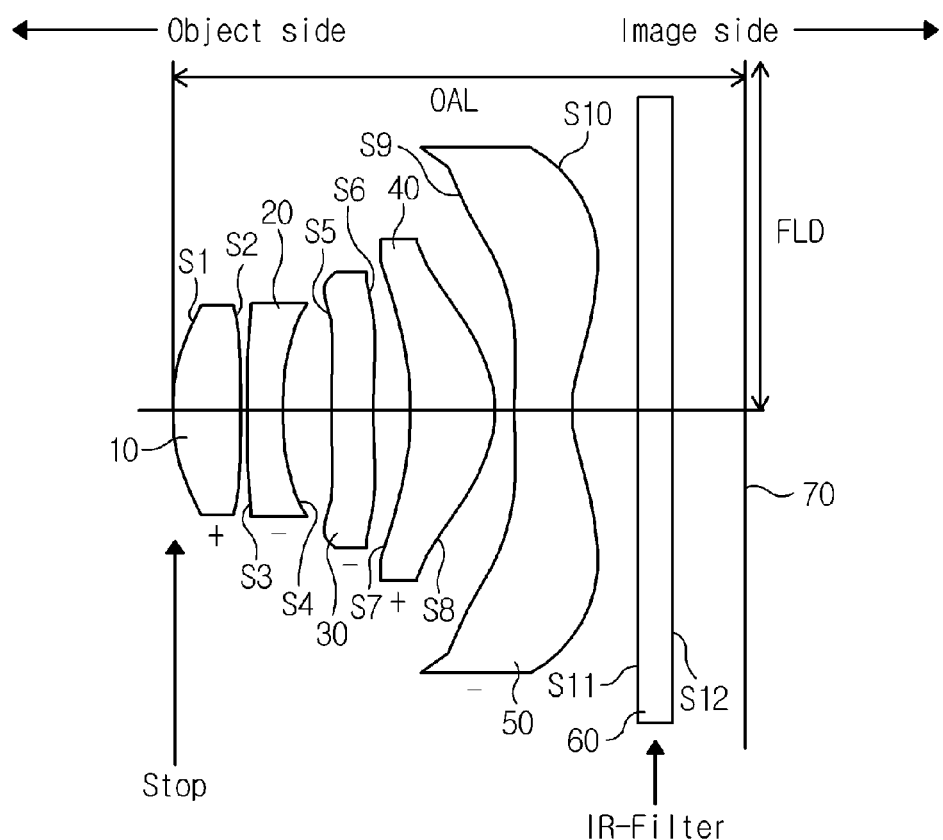
FIG. 1 is a constructional view illustrating a camera module lens according to an exemplary embodiment of the present invention.

FIG. 1 is a constructional view illustrating a camera module lens according to an exemplary embodiment of the present invention.

The camera module lens according to an exemplary embodiment of the present invention is arranged with an imaging lens comprised of a plurality of lenses about an optical axis. In the constructional view of FIG. 1, relative thickness, size and shape of a lens may be exaggerated or reduced for clarity and explanations throughout, and spherical or aspherical shape may be proposed as an example, and therefore the shape is not limited thereto.

Referring to FIG. 1, the camera lens module according to an exemplary embodiment of the present invention is arranged with, in an ordered way from an object side, a first lens (10), a second lens (20), a third lens (30), a fourth lens (40), a fifth lens (50), a filter (60) and a photo-detector (70).

Light corresponding to image information of a subject is incident on the photo-detector (70) by passing the first lens (10), the second lens (20), the third lens (30), the fourth lens (40), the fifth lens (50) and the filter (60).

Hereinafter, in the description of the construction of each lens, an "object side surface" means a surface of a lens facing an object side with respect to an optical axis, and an "image side surface" means a surface of the lens facing a capturing surface with respect to the optical axis.

The first lens (10) has a positive (+) refractive power, the second lens (20) has a negative (−) refractive power, the third lens (30) has a negative (−) refractive power, the fourth lens (40) has a positive (+) refractive power, and the fifth lens (50) has a negative (−) refractive power. At this time, the third, fourth and fifth lenses are aspherical at both surfaces. The fourth lens (40) takes a meniscus form concavely formed at an object side surface.

The fifth lens (50) takes a meniscus shape convexly formed at an object side surface, and an object side surface and an image side surface are all formed with inflection points. An object side surface and an image side surface of the third lens (30) are all formed with inflection points, and the third lens (30) has a smaller refractive power than that of other lenses. Thus, an exemplary embodiment of the present disclosure can realize a high performance, a high resolution and a compact miniaturized imaging lens.

For information, 'S1 and 'S2' of FIG. 1 are respectively an object side surface and an image side surface of the first lens (10), 'S3' and 'S4' are respectively an object side surface and an image side surface of the second lens (20), 'S5' and 'S6' are respectively an object side surface and an image side surface of the third lens (30), 'S7' and 'S8' are respectively an object side surface and an image side surface of the fourth lens (40), 'S9' and 'S10' are respectively an object side surface and an image side surface of the fifth lens (50), and 'S11' and 'S12' are respectively an object side surface and an image side surface of the filter (60).

The filter (60) may be any one optical filter selected from an infrared filter and a cover glass. The filter (60), if applied with the infrared filter, blocks radiant heat emitted from external light from being transferred to the photo-detector (70). Furthermore, the infrared filter transmits visible light, reflects infrared ray and outputs the reflected infrared ray to the outside.

The photo-detector (70) is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

| | |
|---|---|
| $0.5 < f1/f < 1.5$ | [Conditional expression 1] |
| $0.5 < \Sigma T/f < 1.5$ | [Conditional expression 2] |
| $1.6 < N2 < 1.7$ | [Conditional expression 3] |
| $1.5 < N1 < 1.6, 1.5 < N3 < 1.6, 1.5 < N4 < 1.6, 1.5 < N5 < 1.6$ | [Conditional expression 4] |
| $20 < V2 < 30$ | [Conditional expression 5] |
| $50 < V1 < 60, 50 < V3 < 60, 50 < V4 < 60, 50 < V5 < 60$ | [Conditional expression 6] |
| $0.8 < \Sigma T/((FLD) \times 2) < 1.2$ | [Conditional expression 7] |
| $0.6 < \tan \Theta < 0.8$ | [Conditional expression 8] |
| $0 < |1/\beta| < 0.2$ | [Conditional expression 9] | where, f: an entire focus length (distance) of the imaging lens, f1, f2, f3, f4, f5: a focus length of the first, second, third, fourth and fifth lens, ΣT: a distance from an object side surface of the first lens to an image-forming surface, tan Θ: a half field angle of the maximum image height is tan Θ, N1, N2, N3, N4, N5: refractive index of first, second, third, fourth and fifth lens, and V1, V2, V3, V4, V5: Abbe's numbers of the first to fifth lenses.

Conditional expressions 3 and 4 specify refractive indexes of the first to fifth lenses (10, 20, 30, 40, 50). Each of the first to fifth lenses (10, 20, 30, 40, 50) has refractive power having an appropriate compensation of spherical aberration and appropriate chromatic aberration according to the conditional expressions 3 and 4. The conditional expressions 5 and 6 specify Abbe's numbers of the first to fifth lenses (10, 20, 30, 40, 50). The specification of Abbe's numbers of each lens is a condition for better compensation of chromatic aberration.

Hereinafter, the action and effect of the present disclosure will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes $10^1$, and E−02 denotes $10^{-2}$.

$$z = \frac{cY^2}{1 + \sqrt{1-(1+K)c^2Y^2}} + AY^4 + BY^4 + CY^4 + DY^4 + EY^4 + FY^4 + \ldots$$

[Equation 1]

where, z: a distance from the lens's top-point to an optical axis direction, c: basic curvature of a lens, Y: a distance towards a direction perpendicular to an optical axis, K: Conic constant, and A, B, C, D, E, F: aspheric coefficients

[Exemplary Embodiments]

The following Table 1 shows an exemplary embodiment matching the aforementioned conditional expressions.

TABLE 1

|  | Exemplary embodiment |
|---|---|
| f | 4.08 |
| f1 | 2.62 |
| f2 | −4.07 |
| f3 | −851 |
| f4 | 2.32 |
| f5 | −2.28 |
| f1/f | 0.64 |
| ΣT | 4.95 |
| ΣT/f | 1.21 |
| N1 | 1.533 |
| V1 | 56.5 |
| N2 | 1.64 |
| V2 | 23 |
| N3, N4, N5 | 1.533 |
| V3, V4, V5 | 56.5 |
| tanΘ | 0.71 |
| FLD | 2.93 |

Referring to Table 1, it can be noted that f1/f is 0.64 that matches the conditional expression 1, and ΣT/f is 1.21 that matches the conditional expression 2, and 1/f3 is 0.001 that matches the conditional expression 9.

The following Table 2 shows an exemplary embodiment which is a more detailed exemplary embodiment over that of Table 1.

TABLE 2

| Surface number | Curvature radius (R) | Thickness or distance (d) | Refractive index (N) |
|---|---|---|---|
| 1* | 1.636 | 0.589 | 1.53 |
| 2* | −8.522 | 0.06 |  |
| 3* | 29.657 | 0.30 | 1.64 |
| 4* | 2.409 | 0.432 |  |
| 5* | 7.211 | 0.35 | 1.53 |
| 6* | 6.9787 | 0.323 |  |
| 7* | −2.604 | 0.733 | 1.53 |
| 8* | −0.922 | 0.168 |  |
| 9* | 7.432 | 0.5 | 1.53 |
| 10* | 1.022 | 0.569 |  |
| 11 | Infinity | 0.3 | 1.52 |
| 12 | Infinity | 0.624 |  |
| image | Infinity | 0.000 |  |

The notation * in the above Table 2 and following Table 3, which is further written near the surface number indicates aspheric. The following Tables 3 and 4 show a value of aspheric coefficient of each lens in the exemplary embodiment of Table 2.

TABLE 3

| Surface number | k | A | B | C | D | E |
|---|---|---|---|---|---|---|
| 1* | 0 | −0.278840E−01 | −0.115063E−01 | −0.314565E−02 | 0.436500E−02 | −0.364702E−02 |
| 2* | 0 | −0.691104E−02 | −0.212701E−01 | 0.124050E−01 | −0.861190E−02 | 0.297906E−02 |
| 3* | 0 | −0.193793E−01 | 0.103822E−01 | −0.133796E−02 | −0.148393E−02 | 0.104056E−02 |
| 4* | −4.310108 | −0.198769E−01 | 0.309275E−01 | −0.153250E−01 | 0.316803E−02 | −0.164905E−04 |
| 5* | 0 | −0.508923E−01 | 0.134434E−01 | −0.118161E−02 | 0 | 0 |
| 6* | 0 | −0.184261E−01 | 0.197696E−02 | 0.142627E−03 | 0 | 0 |
| 7* | −8.536520 | −0.287370E−01 | 0.202006E−01 | −0.841387E−02 | 0.244085E−02 | −0.357293E−03 |
| 8* | −1.771588 | 0.30330E−01 | −0.176527E−01 | 0.367535E−02 | 0.161459E−03 | −0.760293E−04 |

TABLE 4

| Surface number | k | AR4 | AR5 | AR6 | AR7 | AR8 |
|---|---|---|---|---|---|---|
| 9* | −7.0056E+02 | −1.2757E−01 | 1.1368E−02 | 4.1523E−02 | −5.3501E−03 | −1.2262E+02 |

| | AR9 | AR10 | AR11 | AR12 | AR13 | AR14 |
|---|---|---|---|---|---|---|
| 10* | 4.4870E−04 | 2.8592E−03 | 4.8780E−04 | −4.6489E−04 | | |
| | −6.8439E+00 | −1.4989E−01 | 9.5116E−02 | −1.6103E−02 | −3.3468E−04 | −4.3534E−03 |
| | 9.3429E−04 | 8.5340E−04 | −2.0891E−04 | −2.1224E−05 | | |

Figure 2A:
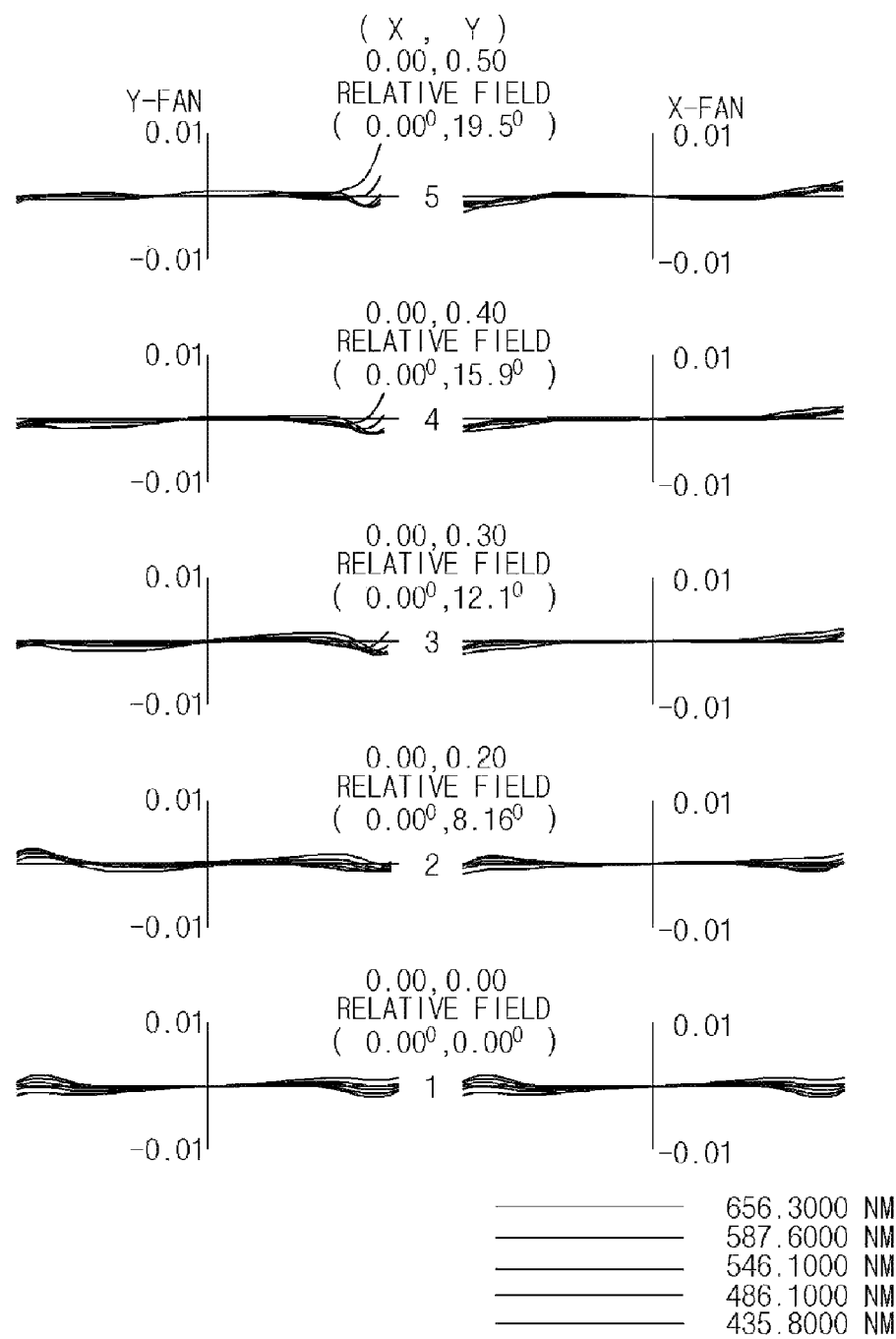
FIGS. 2a and 2b are graphs each measuring coma aberration according to an exemplary embodiment of the present invention.
Figure 2B:
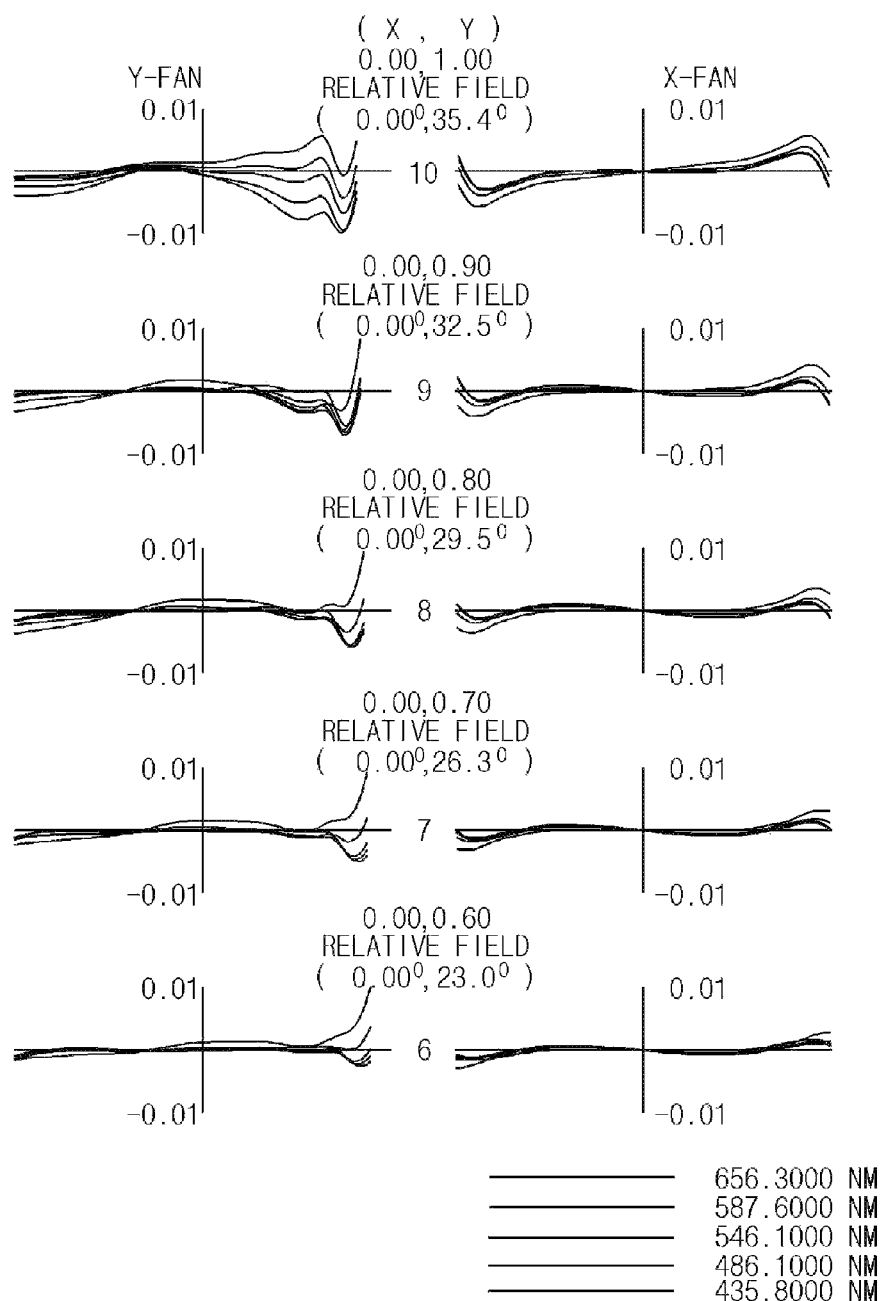

FIGS. 2a and 2b are graphs each measuring coma aberration according to an exemplary embodiment of the present invention, where tangential aberration and sagittal aberration of each wavelength based on a field height are measured. In FIGS. 2a and 2b, it is interpreted that a coma aberration correcting function is good as curves approach the X axis from a positive axis and a negative axis. In the measurement exemplary embodiments of FIGS. 2a and 2b, because values of images in nearly all fields proximate to the X axis, coma aberration correction function demonstrates a superior figure.

Figure 3:
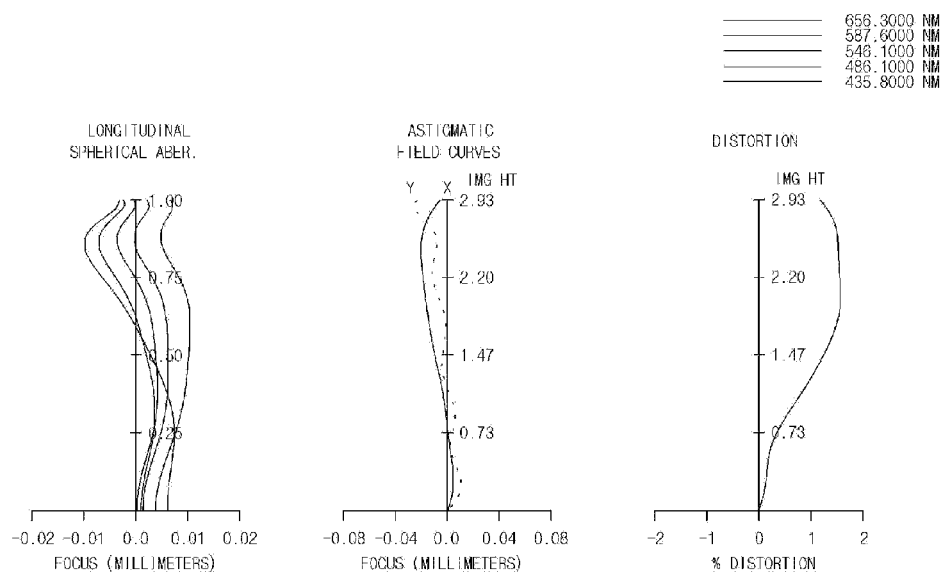
FIG. 3 is a graph illustrating an aberration according to an exemplary embodiment of the present invention.

Furthermore, FIG. 3 is a graph illustrating an aberration according to an exemplary embodiment of the present invention.

That is, FIG. 3 is a graph measuring longitudinal spherical aberration, astigmatic field curves and distortion in order from left side. In FIG. 3, a Y axis means size of an image, and an X axis means focal length (unit: mm) and distortion degree (unit: %). In FIG. 3, it is interpreted that an aberration correcting function is good as curves approach the Y axis. In the shown aberration diagram, because values of images in nearly all fields appear proximate to the Y axis, spherical aberration, astigmatic aberration and distortion aberration all demonstrate a superior figure.

That is, a range of the longitudinal spherical aberration is −0.012 mm~+0.009 mm, a range of astigmatic aberration is −0.035 mm~+0.017 mm, and a range of distortion aberration is 0 mm~+1.5 mm, such that the imaging lens according to the exemplary embodiments of the present invention can correct the characteristics of spherical aberration, astigmatic aberration and distortion aberration, whereby the imaging lens according to the exemplary embodiment of the present invention has an excellent lens characteristics.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

What is claimed is:

1. An imaging lens, the imaging lens comprising:
   in an ordered way from an object side,
   a first lens having positive (+) refractive power;
   a second lens having negative (−) refractive power;
   a third lens having negative (−) refractive power;
   a fourth lens having positive (+) refractive power; and
   a fifth lens having negative (−) refractive power,
   meeting a conditional expression of $0.6<\tan\Theta<0.8$, where a half field angle of the maximum image height is $\tan\Theta$, and
   meeting a conditional expression of $0.8<\Sigma T/((FLD)\times 2)<1.2$, where $\Sigma T$ is a distance from an object side surface of the first lens to an image-forming surface, and FLD is a distance from an optical axis to a maximum image height.

2. The imaging lens of claim 1, wherein the third lens has a smaller refractive power than that of the first, second, fourth and fifth lenses, and
   wherein meeting a conditional expression of $0.5<f1/f<1.5$, where a focal length is f, and a focal length of the first lens is f1.

3. The imaging lens of claim 1, meeting a conditional expression of $0.5<\Sigma T/f<1.5$, where $\Sigma T$ is a distance from an object side surface of the first lens to an image-forming surface, and a focal length is f.

4. The imaging lens of claim 1, meeting a conditional expression of $1.6<N2<1.7$, where refractive index of the second lens is N2.

5. The imaging lens of claim 1, meeting a conditional expression of $1.5<N1<1.6$, $1.5<N3<1.6$, $1.5<N4<1.6$, $1.5<N5<1.6$, where each refractive index of the first, third, fourth and fifth lens is respectively N1, N3, N4 and N5.

6. The imaging lens of claim 1, meeting a conditional expression of $20<V2<30$, where Abbe's number of second lens is V2.

7. The imaging lens of claim 1, meeting a conditional expression of $50<V1<60$, $50<V3<60$, $50<V4<60$, $50<V5<60$, where Abbe's number of each of the first, third, fourth and fifth lens is respectively V1, V3, V4 and V5.

8. The imaging lens of claim 1,
   wherein the second lens has a concave shape at an image side surface.

9. The imaging lens of claim 1, wherein all of the third, fourth and fifth lenses are aspherical at both surfaces.

10. The imaging lens of claim 1, wherein the fourth lens takes a meniscus shape concavely formed at an object side surface.

11. The imaging lens of claim 1, wherein the fifth lens takes a meniscus shape convexly formed at an object side surface, and an object side surface and an image side surface are all formed with inflection points.

12. The imaging lens of claim 1, wherein an object side surface and an image side surface of the third lens are all formed with inflection points, and the third lens has a smaller refractive power than that of other lenses.

13. The imaging lens of claim 1, meeting a conditional expression of $0<|1/f3|<0.2$, where a focal length of the third lens is f3.

14. The imaging lens of claim 1,
   wherein the second lens has a convex shape at an object side surface.

15. The imaging lens of claim 1, wherein the third lens has a smaller refractive power than that of the first, second, fourth and fifth lenses.

16. The imaging lens of claim 1, wherein the second lens has a meniscus shape convexly formed at an object side surface.

17. A camera module, the camera module comprising an imaging lens comprising:
   in an ordered way from an object side,
   a first lens having positive (+) refractive power;
   a second lens having negative (−) refractive power;
   a third lens having negative (−) refractive power;
   a fourth lens having positive (+) refractive power; and
   a fifth lens having negative (−) refractive power,
   meeting a conditional expression of $0.6<\tan\Theta<0.8$, where a half field angle of the maximum image height is $\tan\Theta$, and
   meeting a conditional expression of $0.8<\Sigma T/((FLD)\times 2)<1.2$, where $\Sigma T$ is a distance from an object side surface of the first lens to an image-forming surface, and FLD is a distance from an optical axis to a maximum image height.

18. The camera module of claim 17, wherein the third lens has a smaller refractive power than that of the first, second, fourth and fifth lenses.

19. The camera module of claim 17, wherein the third lens has a smaller refractive power than that of the first, second, fourth and fifth lenses, and wherein meeting a conditional expression of $0.5<f1/f<1.5$, where a focal length is f, and a focal length of the first lens is f1.

20. The camera module of claim 17, meeting a conditional expression of $0.5<\Sigma T/f<1.5$, where $\Sigma T$ is a distance from an object side surface of the first lens to an image-forming surface, and a focal length is f.

* * * * *